United States Patent [19]
Yonezawa

[11] Patent Number: 6,008,837
[45] Date of Patent: Dec. 28, 1999

[54] CAMERA CONTROL APPARATUS AND METHOD

[75] Inventor: Hiroki Yonezawa, Tokyo, Japan

[73] Assignee: Canon Kabushiki Kaisha, Tokyo, Japan

[21] Appl. No.: 08/723,868

[22] Filed: Sep. 30, 1996

[30] Foreign Application Priority Data

Oct. 5, 1995 [JP] Japan .................................. 7-258433
Oct. 23, 1995 [JP] Japan .................................. 7-274442

[51] Int. Cl.⁶ ........................................................ H04N 7/14
[52] U.S. Cl. .................................................. 348/15; 348/722
[58] Field of Search ................................. 348/15, 12, 13, 348/722, 579, 333, 213; H04N 7/14

[56] References Cited

U.S. PATENT DOCUMENTS

| | | | |
|---|---|---|---|
| 5,396,287 | 3/1995 | Cho | 348/211 |
| 5,479,206 | 12/1995 | Ueno et al. | 348/213 |
| 5,570,177 | 10/1996 | Parker et al. | 348/213 |
| 5,589,878 | 12/1996 | Cortjens et al. | 348/211 |
| 5,757,418 | 5/1998 | Inagaki et al. | 348/15 |

FOREIGN PATENT DOCUMENTS

| | | |
|---|---|---|
| A-604009 | 6/1994 | European Pat. Off. . |
| A-2693868 | 1/1994 | France . |
| 2273410 | 6/1994 | United Kingdom . |

OTHER PUBLICATIONS

European Search Report in Application No. EP 95 30 8227, dated Feb. 28,1996, citing to the references listed herein.

*Primary Examiner*—Brian L. Casler
*Assistant Examiner*—LuAnne P Din
*Attorney, Agent, or Firm*—Morgan & Finnegan, LLP

[57] ABSTRACT

A current image-sensing area of a camera is displayed as a first frame, and a potential image-sensing area obtainable by panning/tilting the camera at an image-sensing magnification is displayed as a second frame. To control panning/tilting of the camera, a display position of the second frame is changed, and in accordance with the changed display position, control data is transferred to the camera.

59 Claims, 14 Drawing Sheets

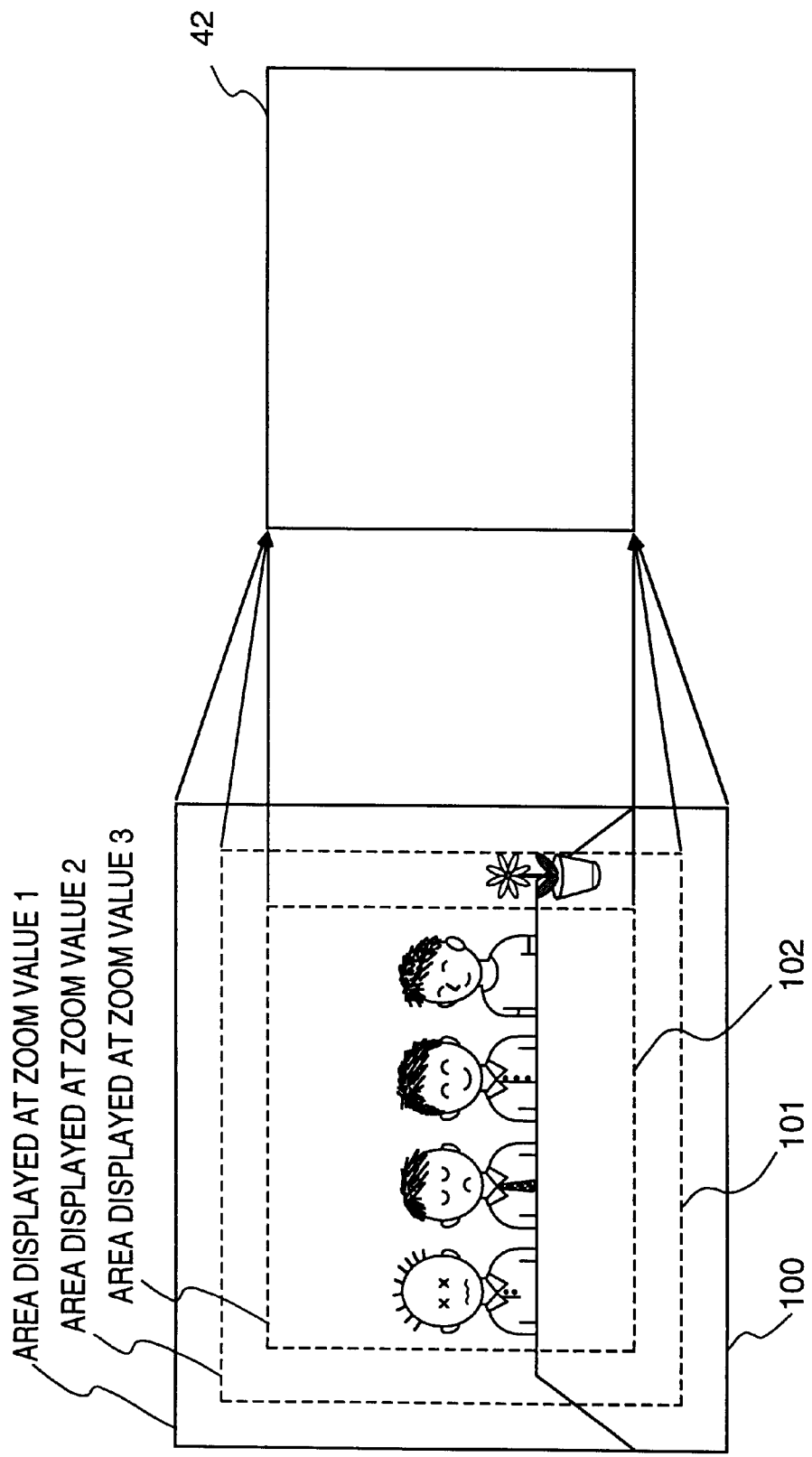

CAMERA CONTROL APPARATUS AND METHOD

BACKGROUND OF THE INVENTION

This invention relates to a camera control apparatus and, more particularly to a camera control apparatus and method which controls image-sensing direction (panning/tilting) and image-sensing magnification (zooming).

Conventionally, as a means to remote-control panning/tilting and zooming of a video camera, operation levers, a joy stick, push-button switches corresponding to two-axial rotation or display of such tools with a pointing device such as a mouse, are known. For example, a rotation angle or angular velocity is controlled by a lever angle, or rotation in an upward/downward/rightward/leftward direction is made by a button being pressed. Similarly, zoom control is made by using a button for designating a wide-end (pantoscope) position or a tele-end (telescope) position.

With the camera operation means or control device, a camera is panned/tilted in accordance with operation of the pan/tilt control. This is suitable for operation while observing a monitor screen image; however, it is not convenient when moving to a target position is away from the current camera position.

To solve this problem, a controller can be provided to directly input respective pan and tilt angles as numerical values. The controller determines movement of the camera to the target positions. However, in this case, an operator cannot intuitively determine an area within a panning/tilting range, i.e., an image area which comes into an image-sensing view.

SUMMARY OF THE INVENTION

The present invention has been made in consideration of the above situation, and has its object to provide a camera control apparatus which solves the above problems.

Accordingly, an object of the present invention is to provide a camera control apparatus which can simply and quickly control a camera to a target regardless of current pointing position of the camera.

Another object of the present invention is to provide a camera control apparatus which accurately presents an operator an image-sensing view to be obtained, upon control to target status.

According to the present invention, the foregoing object is attained by displaying a first frame indicating a maximum image-sensing area, defined by limitation of image-sensing directions and a second frame within the first frame, indicating an current image-sensing area. The second frame is displayed at a fixed position, and a display position and a display size of the first frame are changeable such that those of the second frame correspond to a current image-sensing direction and image-sensing magnification with respect to the first frame. Thus, zooming is more similar to human action to move closer to an object so as to enlarge the object in his/her sight. This assists the operator to make more intuitive operation.

Further, as the panning/tilting and zooming of the camera can be controlled by operating the first frame, operability is greatly improved.

Further, as an object within the maximum image-sensing area is sensed in advance and displayed within the first frame, a portion of the object to be image-sensed can be more accurately selected. Thus, the panning/tilting and zooming of camera can be controlled with appropriate values.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 18 is an explanatory view showing the relation between a wide-angle image and the frame 42 according to the second embodiment.

DETAILED DESCRIPTION OF THE PREFERRED EMBODIMENTS

Preferred embodiments of the present invention will now be described in detail in accordance with the accompanying drawings.

[First Embodiment]

Figure 1:
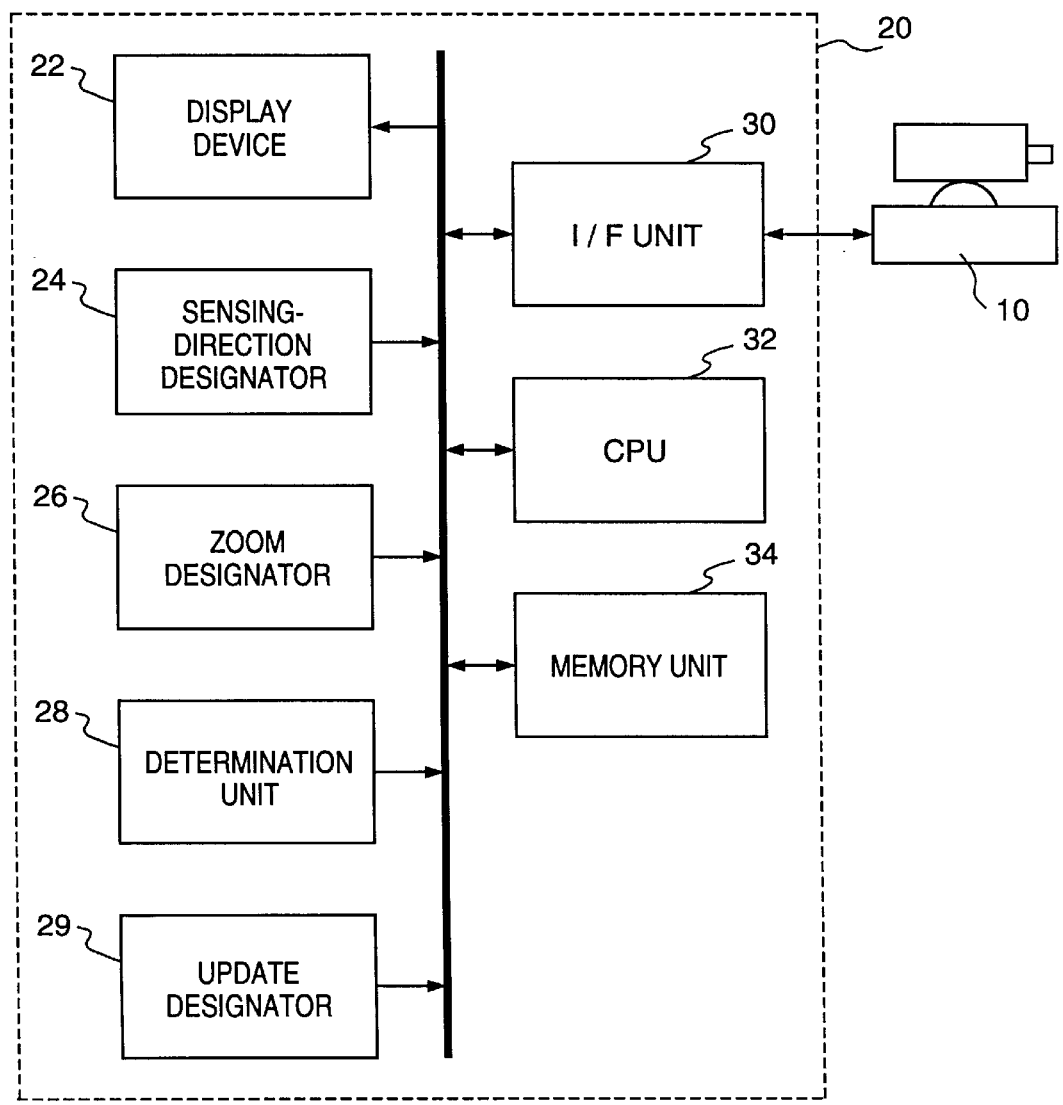
FIG. 1 is a block diagram schematically showing a construction of a first embodiment of the present invention.

FIG. 1 is a block diagram schematically showing a construction of a first embodiment of the present invention. In FIG. 1, reference numeral 10 denotes a video camera in which panning/tilting and zooming can be controlled; 20, a camera controller, according to the present embodiment, which controls the video camera 10; 22, a display device which displays a potential maximum image-sensing area of the video camera 10 and an image-sensing area based on current pan/tilt (pan and/or tilt) and zoom values or control values; 24, a sensing-direction designator which designates a target image-sensing direction; 26, a zoom designator which designates a zoom value in the target image-sensing direction; 28, a determination unit which determines input of new image-sensing area; 29, an update designator which designates to update a sensed image within the potential maximum image-sensing area; 30, an I/F (interface) unit for the video camera 10; 32, a CPU which controls the overall camera controller 20; and 34, a memory unit for storing control programs of the CPU 32, control variables, current and maximum pan/tilt and zoom values, and the like. The I/F unit 30 and the camera 10 are connected via a network cable, a communication line or the like.

Figure 2:
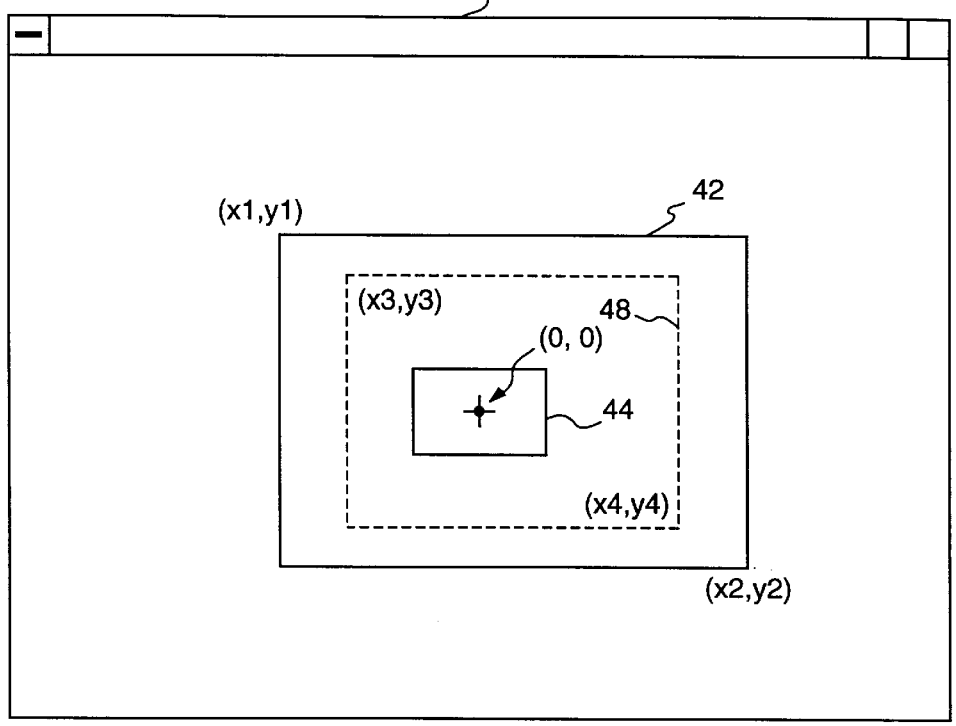
FIG. 2 is a schematic view showing basic display elements on a display device 22 of the first embodiment.

FIG. 2 is a schematic view showing basic display elements on a display device 22 of the first embodiment. The camera controller 20 of the present embodiment is constructed as, e.g., a part of a work station used as a terminal of a teleconference system. One window of a monitor screen image displayed at the work station functions as a display image on the display device 22.

In FIG. 2, a rectangular frame 42 indicates a maximum image-sensing area corresponding to maximum view of the camera 10 in a case where pan/tilt values are varied with a current zoom value.

A frame 44 indicates a current image-sensing area. The central coordinate position of the image-sensing area is fixed with respect to a window 46. In this embodiment, the center of the frame 44 coincides with the center of the window 46. Note that in this embodiment, the window 46 is larger than the frame 42, however, this is made to assist understanding of the embodiment and the size of the window 46 is not necessarily larger than the frame 42. The frame 42 can be larger than the window 46, so far as the frame 42 can be moved in the window 46 by vertically and horizontally scrolling information displayed within the window 46 with a slider (scroll) bar or the like. Although the frame 44 is displayed at a fixed position and in a fixed size with respect to the window 46, if the window 46 is moved within the display screen image, the frame 44 moves following the movement of the window 46.

A frame 48 represents maximum coordinates from the center of the frame 44 within the frame 42, obtained on the assumption that the frame 42 is moved to the pan and tilt maximum values (actually, the display position and size of the frame 42 are changed, as described later). The sizes of the frames 42 and 48 change in proportion to a zoom value.

Note that the value of status at the minimum zoom ratio (magnification) will be referred to as "zoom value 1", and that at the maximum zoom ratio (tele-end zooming (with the longest focal distance)), "zoom value 3".

Figure 3:
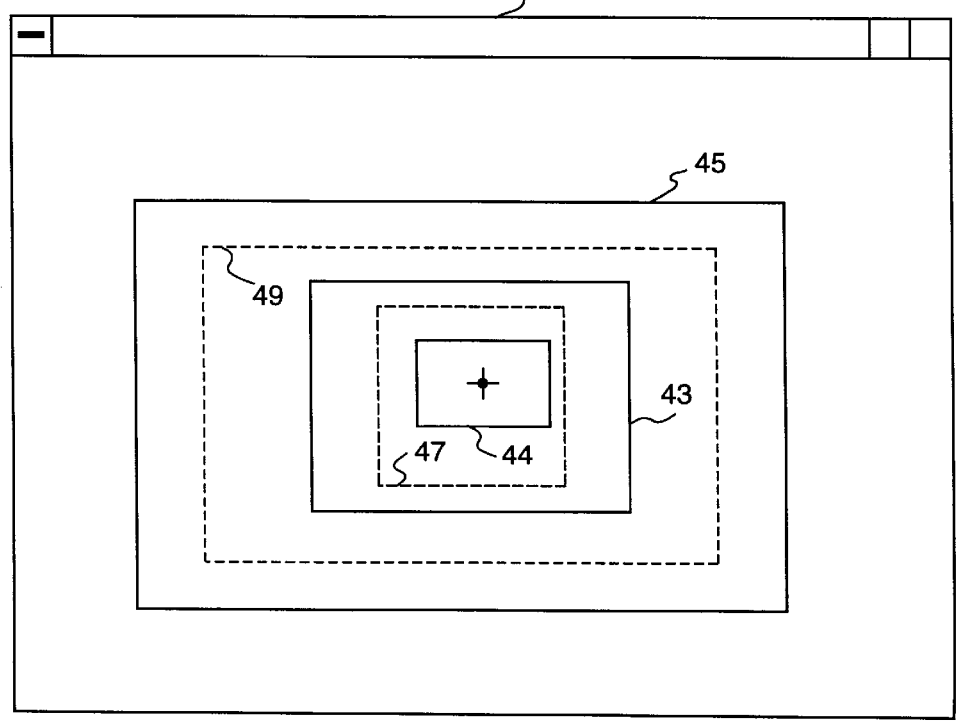
FIG. 3 is a display example on the display device 22 of the first embodiment.

FIG. 3 is a display example of the window 46 when the camera, having a maximum pan angle from −80° to +80°, a maximum tilt angle from −50° to +50°, and zoom values 1 to 3, is set at a pan angle 20° and tilt angle 20°. In FIG. 3, a frame 43 indicates a potential maximum image-sensing area at the zoom value 1; and a frame 45 represents a potential maximum image-sensing area at the zoom value 3. A frame 47 represents maximum coordinates from the center of the frame 44 obtained within the frame 43 on the assumption that the frame 44 of the current image-sensing area is moved to maximum pan and tilt values. Similarly, a frame 49 represents maximum coordinates from the center of the frame 44 obtained within the frame 45 on the assumption that the frame 44 is moved to the maximum pan and tilt values.

Although the pair of frames 45 and 49 and the pair of frames 43 and 47 are both displayed in FIG. 3, actually, only one of these pair is displayed. That is, the frame 44 indicating a current image-sensing area and a frame indicating a potential range (frame 45 or 43) and a maximum range from the center of the frame 44 (frame 49 or 47) at a zoom value at that time are displayed.

Figure 4A:
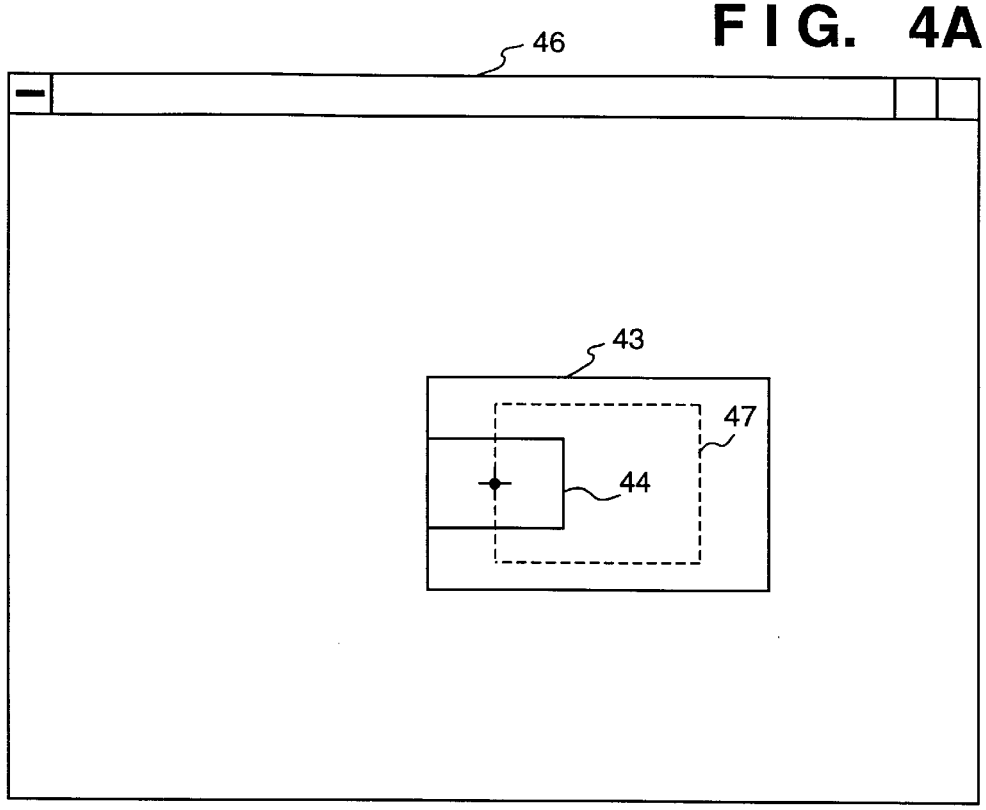
FIGS. 4A and 4B are display examples on the display device 22 of first embodiment.
Figure 4B:
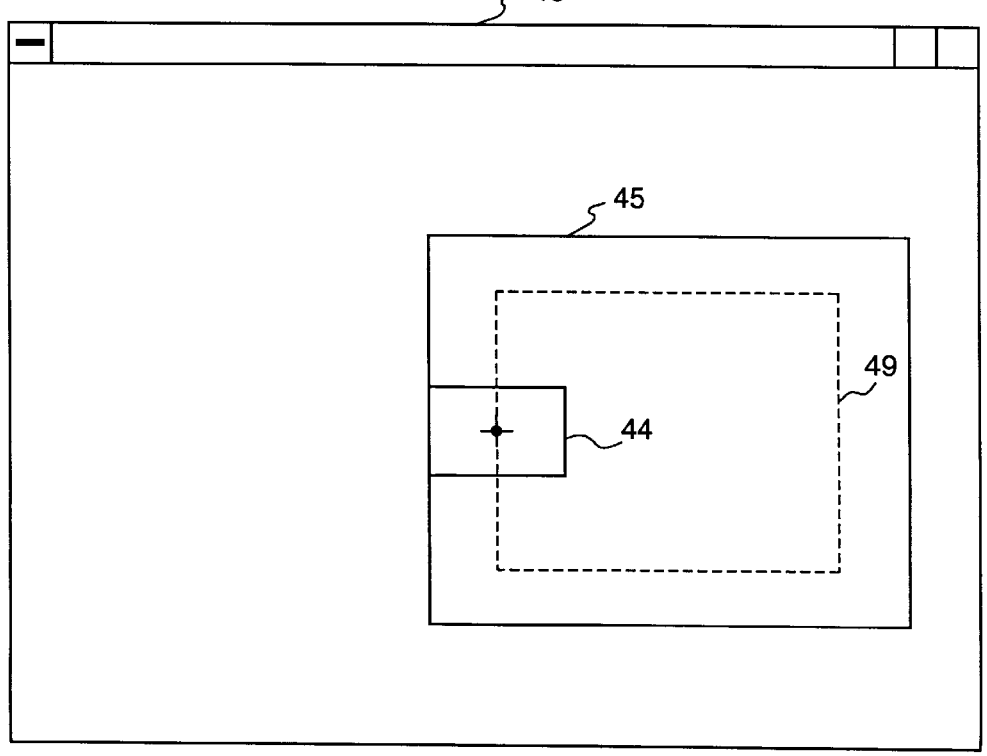

FIG. 4A is a display example of the window 46 when a camera, having a maximum pan angle from −80° to +80°, a maximum tilt angle from −50° to +50°, and zoom values 1 to 3, is set at a pan angle −80°, tilt angle 0° and the zoom value 1 (minimum zoom ratio). FIG. 4B is a display example of the window 46 when the camera is set at the same pan angle, the same tilt angle and the zoom value 3 (maximum zoom ratio).

In FIG. 4A, the area of the frame 44 of the current setting has the potential maximum area 43 at the zoom value 1 and has a larger potential maximum area 45 in FIG. 4B at the zoom value 3. That is, when a magnification is large, a view angle is small, while the magnification is small, the view angle is large.

Figure 5:
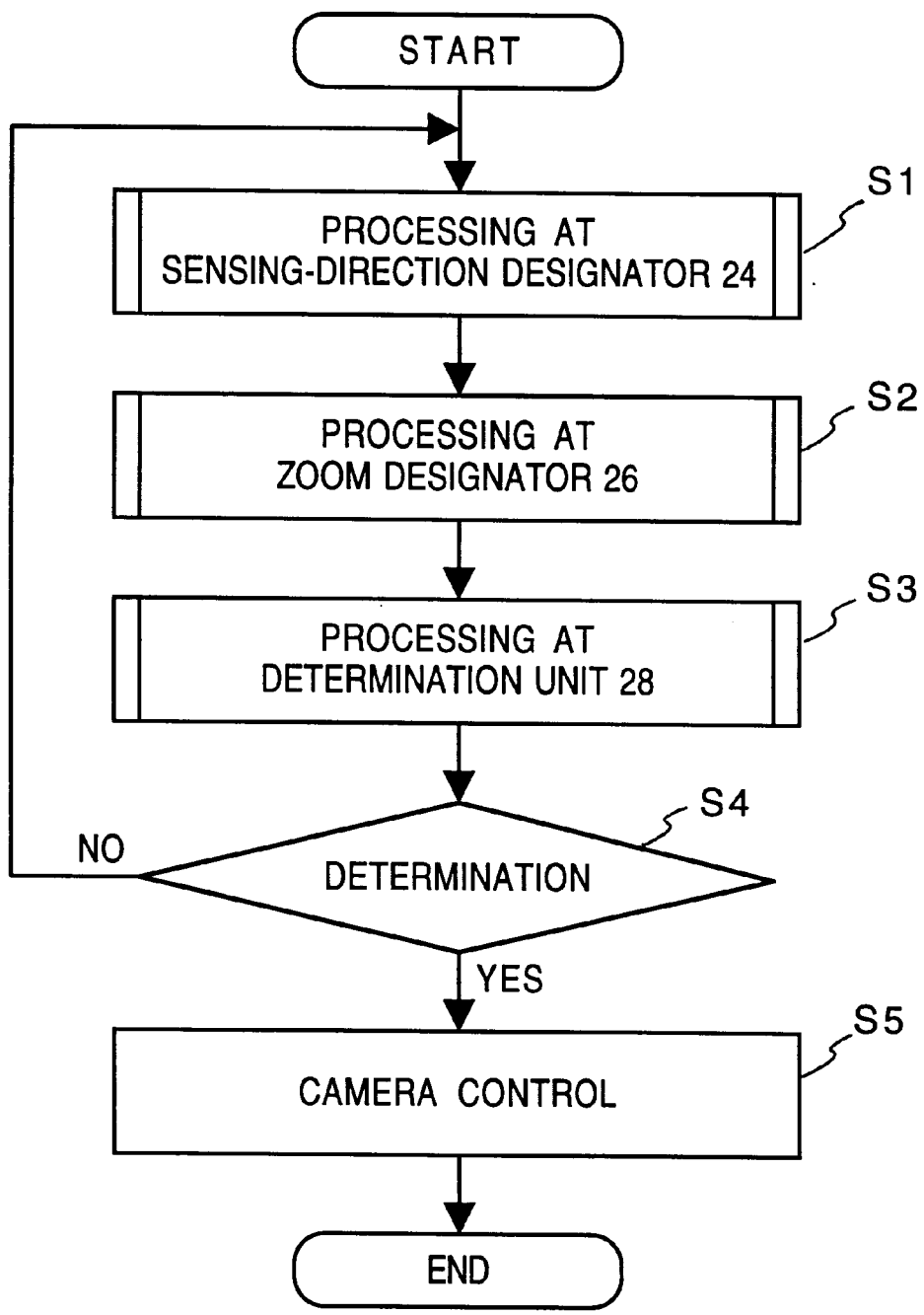
FIG. 5 is a flowchart showing a main routine according to the first embodiment.

Next, the operation of the present embodiment will be described with reference to FIGS. 5 to 8. FIG. 5 shows a main routine of the operation of the present embodiment. In this routine, processing at the sensing-direction designator 24 (S1), processing at the zoom designator 26 (S2) and processing at the determination unit 28 (S3) are sequentially performed. After the processing at the determination unit 28 (S3), if target pan/tilt and zoom values have been determined (S4), as designation of a new image-sensing area has been completed, the video camera 10 is controlled to a pan/ tilt and a zoom values corresponding to the target values (S5). If target values have not been determined (S4), steps S1 to S3 are repeated.

Figure 6:
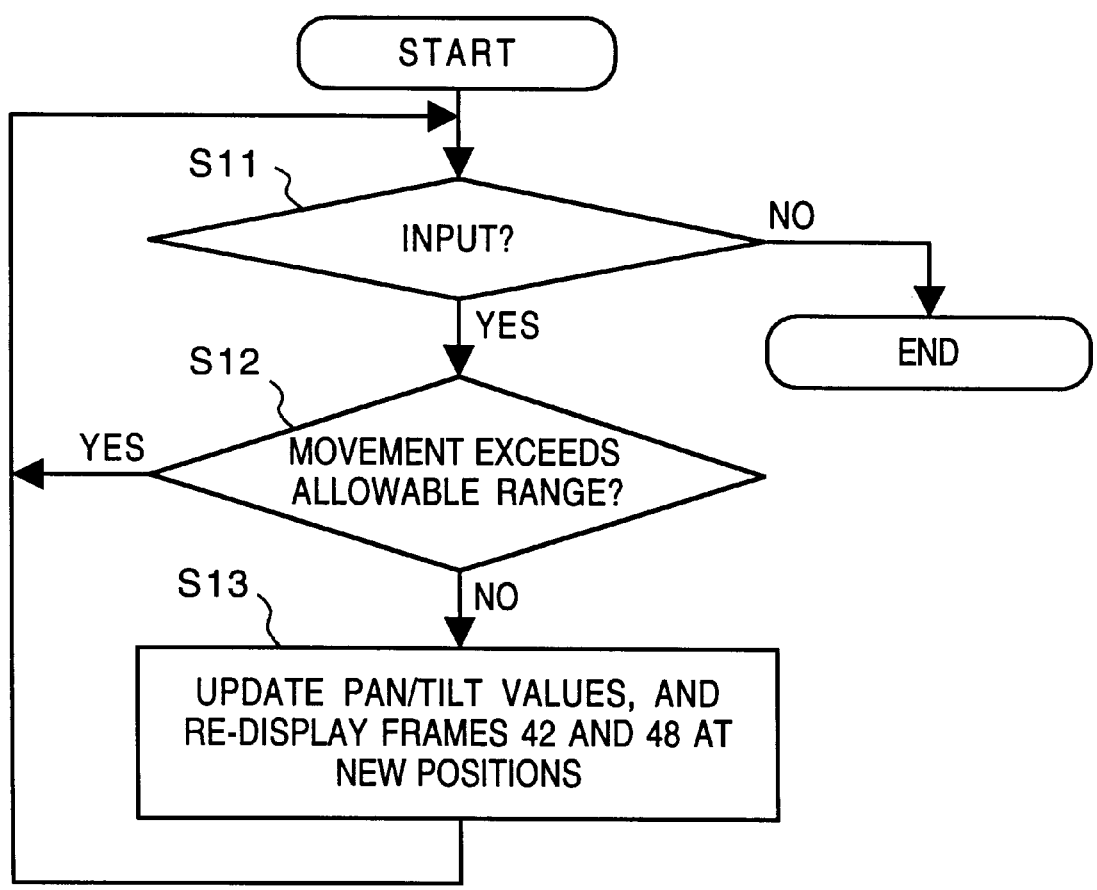
FIG. 6 is a flowchart showing in detail processing at step S1 in FIG. 5.

FIG. 6 is a flowchart showing in detail processing at step S1 in FIG. 5. The present embodiment employs a pointing device (mouse in this embodiment) as the sensing-direction designator 24, and designates a new position of the frame 42 by operating (dragging) the pointing device.

More specifically, it is first determined whether or not there has been input at the sensing-direction designator 24 (S11). The "input" means that a mouse is moved while a mouse button is pressed, when a cursor is displayed on the frame 42. At this time, the frame 48 moves corresponding to the operation of the mouse. If it is determined that there has not been input at the sensing-direction designator 24 (S11), i.e., the mouse button has not been pressed, the processing in FIG. 6 ends, and moves to step S2 of the main routine in FIG. 5. If the mouse has been moved (S11), it is determined whether or not the center of the frame 44 is without an area corresponding to the moving frame 48 (S12). If Yes, the process returns to step S11; while if NO, pan/tilt values stored in the memory unit 34 are set to values corresponding to the new position of the frame 42. Further, the frames 42 and 48 are displayed at the new positions (S13).

Figure 7:
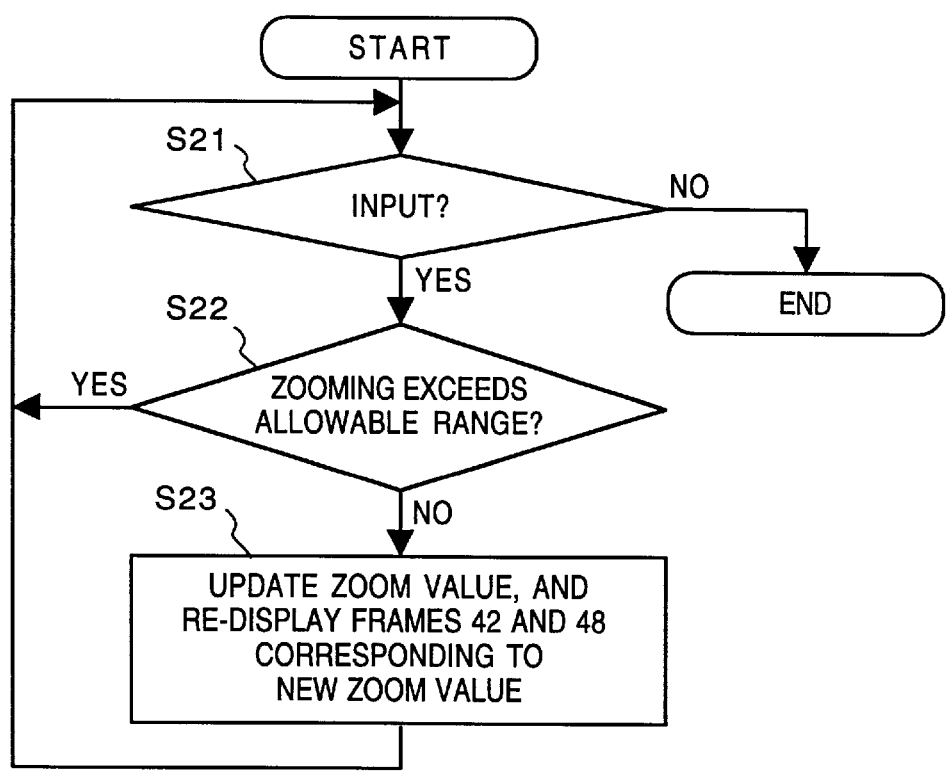
FIG. 7 is a flowchart showing in detail processing at step S2 in FIG. 5.

FIG. 7 is a flowchart showing in detail processing at step S2 in FIG. 5. The present embodiment employs specific key (e.g., an UP/DOWN key of zooming level) or a similar button on a graphical user interface (GUI) as the zoom designator 26.

First, it is determined whether or not there has been input at the zoom designator 26 (S21). If NO, the processing in FIG. 7 ends, and moves to step S3 of the main routine in FIG. 5. If YES (S21), it is determined whether or not zoom amount exceeds the zoom allowable range (S22). If YES, the process returns to step S21; while if NO, the zoom value stored in the memory unit 34 is updated to the new value corresponding to the input at the zoom designator 26. Further, on the display screen of the display device 22, the frames 42 and 48 are displayed in sizes and at positions corresponding to the new zoom value (S23).

Figure 8:
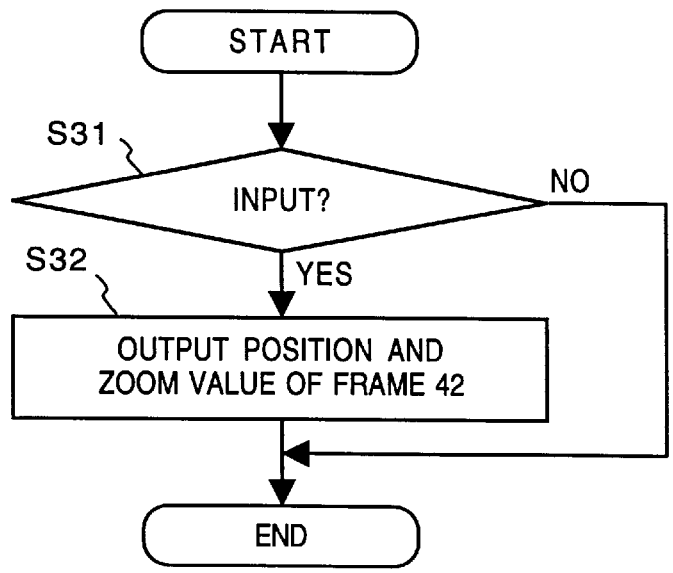
FIG. 8 is a flowchart showing in detail processing at step S3 in FIG. 5.

FIG. 8 is a flowchart showing in detail processing at step S3 in FIG. 5. The present embodiment employs a specific key (e.g., an ENTER key) or a similar button on a GUI as the determination unit 28. First, it is determined whether or not there has been an input at the determination unit 28 (S31). If NO, the pan/tilt and zoom values stored in the memory unit 34 are outputted for other processing, and the process ends (S32).

If determination of input has been made at the determination unit 28, respective pan, tilt and zoom control amounts are calculated based on values stored in the memory unit 34 at that time, and the obtained values are transmitted to the video camera 10.

A video image image-sensed by the video camera 10 is displayed in a video-display window provided at other clients on the network, or displayed in a video display window (not shown) provided on the screen of the display device 22 via the I/F unit 30.

In the main routine according to the present embodiment, inputs at the respective devices 24, 26 and 28 are sequentially checked by a polling method, however, the processing at the respective devices 24, 26 and 28 can be implemented as interrupt processing or a procedure called from GUI.

Further, specific key-input is considered as input at the zoom designator 26, however, it may be arranged such that a pointing device such as a mouse be used to designate zooming by moving a specific control point displayed on the frame 42, as in a graphic software. Further, panning/tilting and zooming can be integrally designated by moving a frame and expanding/reducing the frame, as in graphic software.

In the present embodiment, the video camera 10 is controlled in accordance with determination of new designation of the frame 42 (S5 in FIG. 5). However, it may be arranged such that when any of pan/tilt and zoom values is changed, the camera 10 is controlled in correspondence with the value immediately. It is possible to select one of these methods as operation mode.

In a case where data transfer between the video camera 10 and the controller 20 is made at high speed, it is desirable to real-time transfer the result of operation with respect to the frame 42 to the video camera 10 without designation from the determination unit 28, since real-time control is possible.

Contrary, if the data-transfer speed is relatively low, upon operation such as moving with respect to frame 42, as a control signal is transferred at each operation step, response becomes slow. Accordingly, if the data-transfer speed is relatively low, it is preferable to transfer control data to the video camera 10 after designation at the determination unit 28 has been confirmed, as described above.

The camera controller 20 first detects a data-transfer speed between the video camera 10, and automatically changes the data-transfer speed. To detect a data-transfer speed, the camera controller 20 may transfer an appropriate control signal (data) to the video camera 10 and receives acknowledgment from the video camera 10 so that the data-transfer speed can be determined from time delay.

Next, immediate control of the video camera 10 in case of change in pan, tilt and zoom values has occurred will be described.

Figure 11:
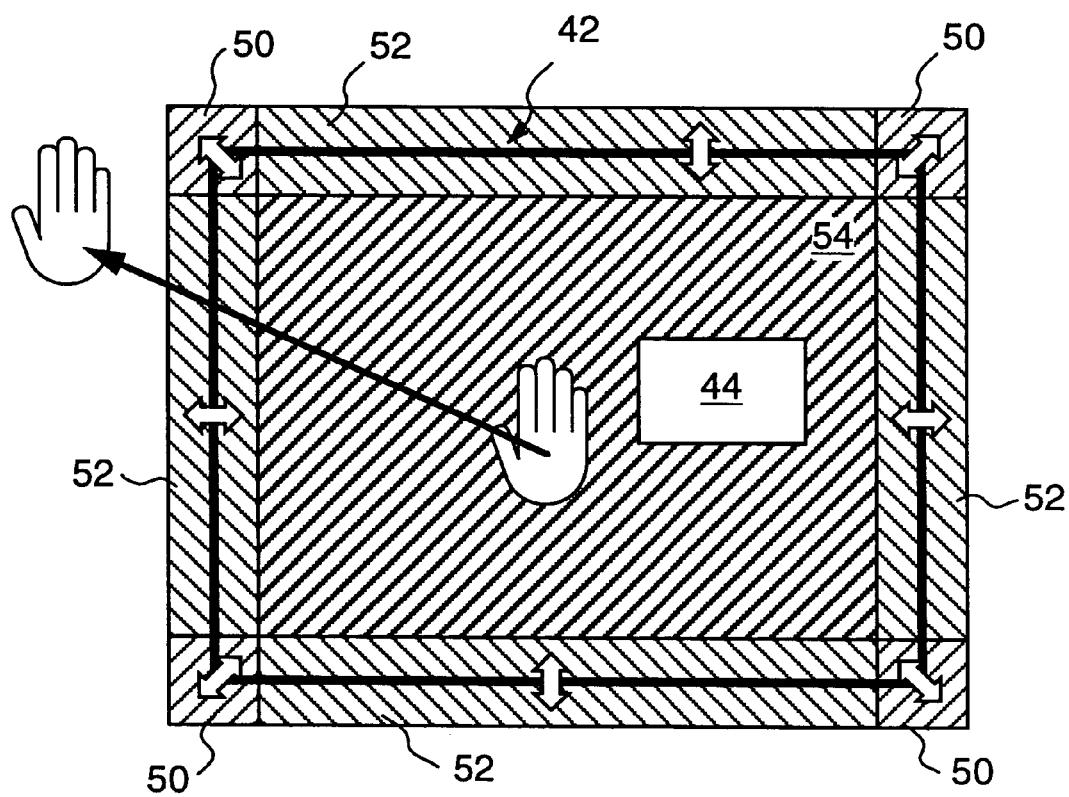
FIG. 11 is an explanatory view showing pan/tilt and zoom operation areas overlaid on a frame 42.

FIG. 11 shows, with different hatched areas with respect to the frame 42 (FIG. 2) showing an image-sensing area at a current zoom value, three areas 50, 52 and 54. That is, the areas 50 are overlapped at the four corners of the frame 42 by areas 52, the area 52 extends along the four ends of the frame 42, and the area 54 is an area obtained by removing the area 44 from the residual area within the area 42. These areas 50, 52 and 54 are operation areas respectively for panning, tilting and zooming.

The area 54 is employed for panning/tilting. When the mouse cursor is moved into the area 54, the mouse cursor is transformed into an icon ("hand" in FIG. 11) indicative of pan and/or tilt operation. When this icon is dragged, the CPU 32 updates the position of the frame 42 to a position moved by direction of the movement and corresponding amount, in correspondence with this operation, further, the CPU 32 pans/tilts the video camera 10 by corresponding angle(s). FIG. 11 shows an example where the mouse cursor ("hand" icon) is moved diagonally left-upward. As it is well known, drag operation is completed when the mouse button is released, then the pan/tilt operation is completed.

If the camera controller 20 has a high processing performance and a high data transfer speed, it can rotate-control the video camera 10 following the drag operation. If the camera controller 20 has a low processing performance, it only updates the position of the frame 42 during the drag operation, and it rotate-controls the video camera 10 after the completion of drag operation.

The areas 50 and 52 are employed for zooming. When the mouse cursor is moved into the area 50 or 52, the mouse cursor is transformed into an icon ("double-headed arrow" indicating expansion/reduction of the frame 42 in FIG. 11) indicative of zoom operation. When this icon is dragged while the mouse button is pressed, the CPU 32 updates the size of the frame 42 in correspondence with a movement amount toward inside/outside of the frame 42, further, the CPU 32 controls the video camera 10 with the new zoom value. The drag operation is completed when the mouse button is released, and the zoom operation is completed. In zoom operation, zoom control of the video camera 10 following drag operation is performed depending upon the processing performance and the data-transfer speed of the camera controller 20.

[Modification]

Figure 9:
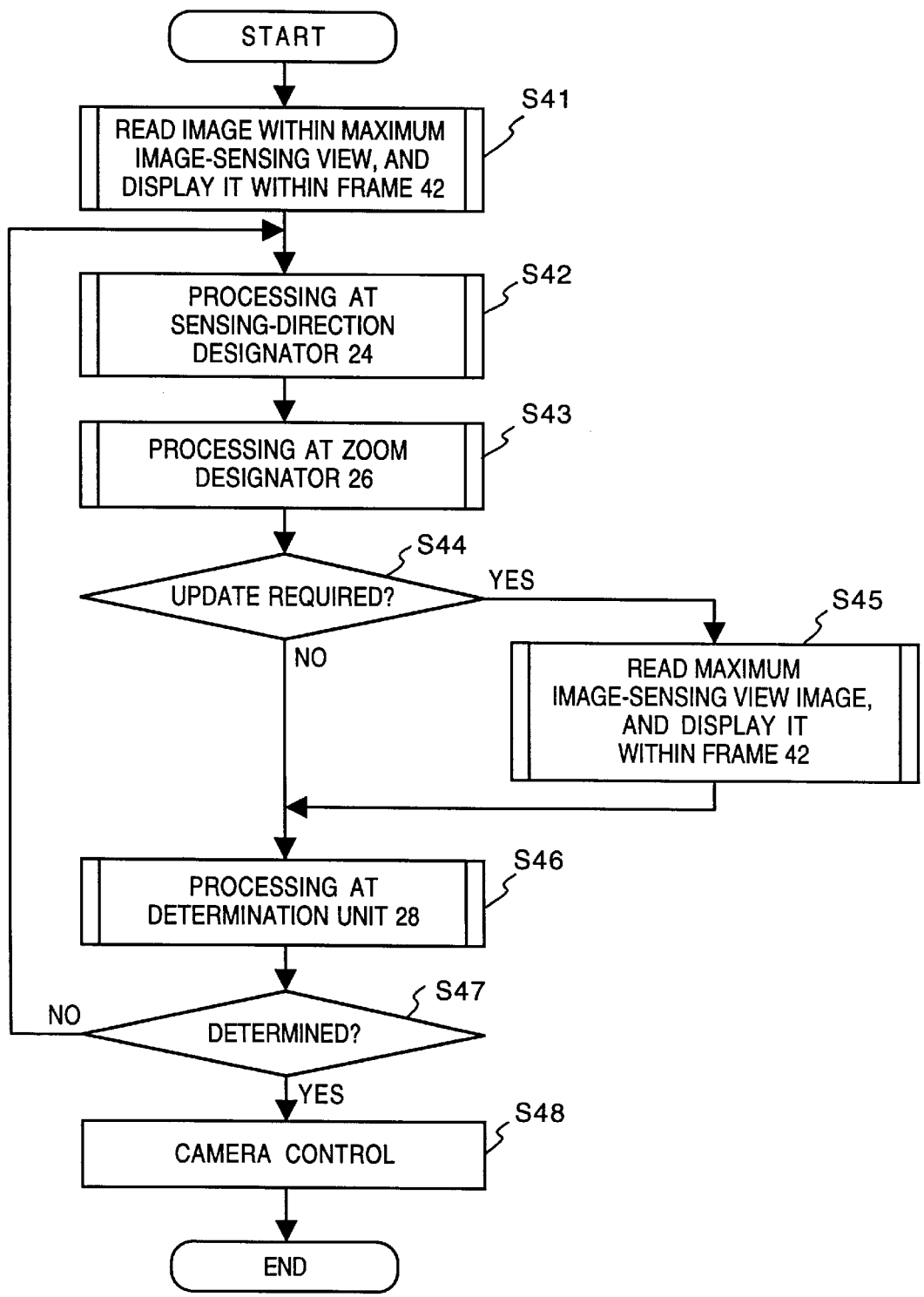
FIG. 9 is a modification example of the main routine.

FIG. 9 shows a modification to the main routine in FIG. 5. In FIG. 9, at step S41, a plurality of views (i.e., an image within a potential maximum view) obtained whenever change of panning/tilting at the zoom value 1 (wide-end zooming) are linked and displayed within the frame 42.

First, at the zoom value 1, the video camera 10 is controlled to obtain partial video images within the potential maximum image-sensing area, and the partial video images are transferred. The partial video images are received and stored as respective image data into the memory unit, for example, and image data representing one large image is generated by linking the stored respective image data. Thereafter, in the image data representing the one large image, image data corresponding to an area based on a zoom value before the current processing is extracted, and through predetermined processing, displayed within the frame 42. As the processing upon displaying the data within the frame 42, well-known thinning and interpolation methods used in image expansion/reduction are employed.

Figure 12:
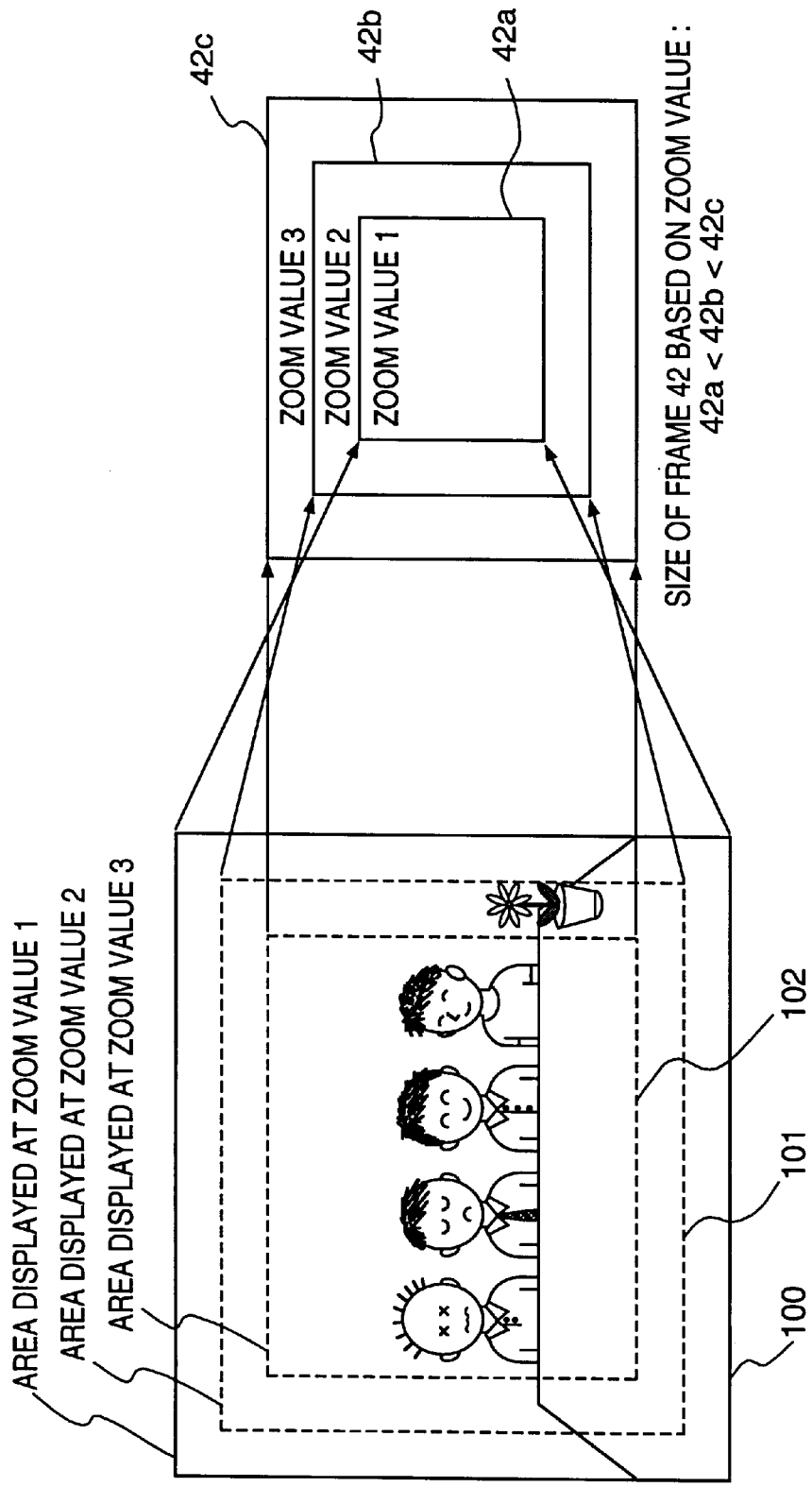
FIG. 12 is an explanatory view showing the relation between an wide-angle image and the frame 42.

FIG. 12 is an explanatory view showing relation between an wide-angle image and the frame 42, for more detailed explanation. In FIG. 12, numeral 100 denotes an image generated by linking images obtained from sequential pan/ tilt controls. Numeral 100 also denotes an area to be displayed within the frame 42 at the zoom value 1. Numeral 101 denotes an area to be displayed within the frame 42 at the zoom value 2; and 102, an area to be displayed within the frame 42 at the zoom value 3.

Thus, the area displayed within the frame 42 changes in accordance with zoom value, since the actual position and size of the image-sensing area 44 of the video camera 10 are fixed. Note that the positions and sizes of the areas 100 to 102 are calculated based on the zoom value, however, it may be arranged such that a table having zoom values, extracted positions and sizes is prepared in advance and the positions and sizes of these areas are obtained by utilizing the table.

Figure 13:
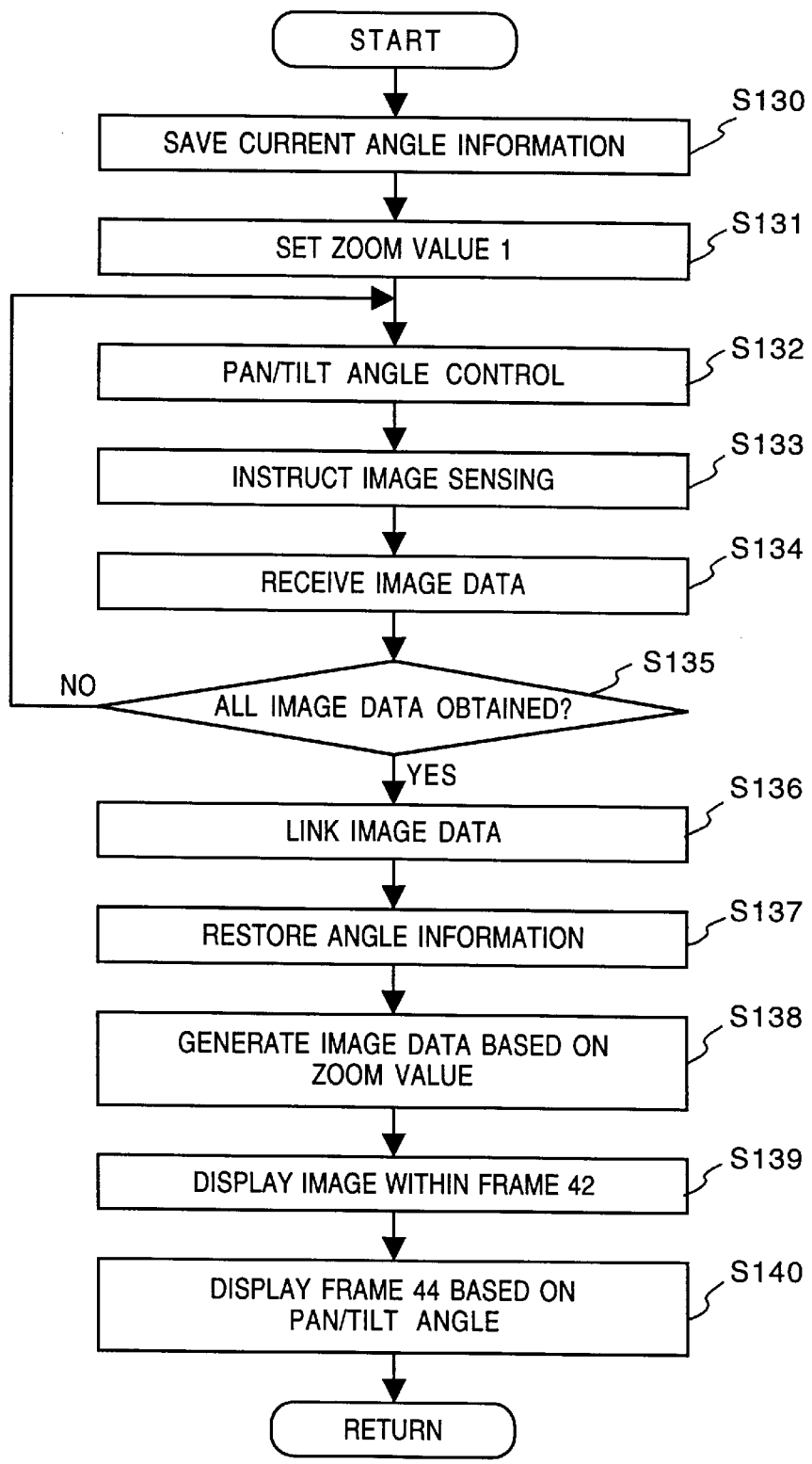
FIG. 13 is a flowchart showing processing at step S41 in FIG. 9.

The above processing is implemented in accordance with a procedure as shown in FIG. 13.

At step S130, current angle information, i.e., a pan angle, a tilt angle and a zoom value are saved. At step S131, the zoom value 1 is set. At step S132, the pan angle and the tilt angle are newly set, and at step S133, request for taking a picture is made. At step S134, video data (image data) is received from the video camera 10, and the received data is stored into the memory unit 34. At step S135, it is determined whether or not all the image data of necessary partial images to generate an image corresponding to the area 100 (FIG. 12) have been obtained. If NO, the process returns to step S132, to perform image sensing at other angles.

Thus, as all the image data of necessary images to generate an image to be displayed in the frame 42 have been obtained, the process proceeds to step S136, at which the respective image data are linked, and one image data corresponding to the area 100 is generated.

Thereafter, the process proceeds to step S137, at which the saved angle information is restored. At step S138, an image within an area (any of areas 100 to 102) of a size based on the restored zoom value is extracted, and image processing such as thinning or interpolation is performed on the image so as to be adjusted to the size of the frame 42 at the zoom value.

As image data to be displayed within the frame 42 has been generated, the image is displayed within the frame 42 (and 48) at step S139. At step S140, the frame 44 is displayed.

Thus, as an image around the frame 44, i.e., a current image-sensing area can be displayed within the frame 42, an operator can see object(s) or person(s) around the frame 44.

The processing at step S41 in FIG. 9 is as described above. Next, processing at step S42 will be described below.

Similar to FIG. 5, the processing at the sensing-direction designator 24 (S42) and the processing at the zoom designator 26 (S43) are called. Note that if the zoom value is changed by the zoom designator 26, the image to be displayed within the frame 42 is changed. In this case, within the one image data in the memory unit 34, an area based on the changed zoom value is extracted, and after predetermined processing, an image of the extracted area is displayed within the frame 42.

If there has been a requirement to update the maximum range image at the update designator 29 (S44), the image to be displayed within the frame 42 is updated (S45). This step S45 is the same as previously described step S41. That is, if zooming is set to a tele-end zooming, image sensing is sequentially made while panning/tilting from one end to the other end of the pan/tilt range. The obtained image data is stored into the memory unit 34, and an image is displayed in the size of the frame 42. Then, the processing at the determination unit 28 is called (S46), and if input of camera control has been determined (S47), pan/tilt and zoom controls are made based on set values corresponding to a new position of the frame 44 (S48).

As the maximum image-sensing area image displayed within the frame 42 is obtained by linking a plurality of sensed images, it has distortions at joint portions. However, such distortions do not damage the advantageous points in operation of the present embodiment. Further, the update requirement (S44) is not limited to operation of the update designator 29. For example, the update requirement may be a plurality of specific operations. Furthermore, a currently-sensed image may be displayed within the frame 42.

Figure 10:
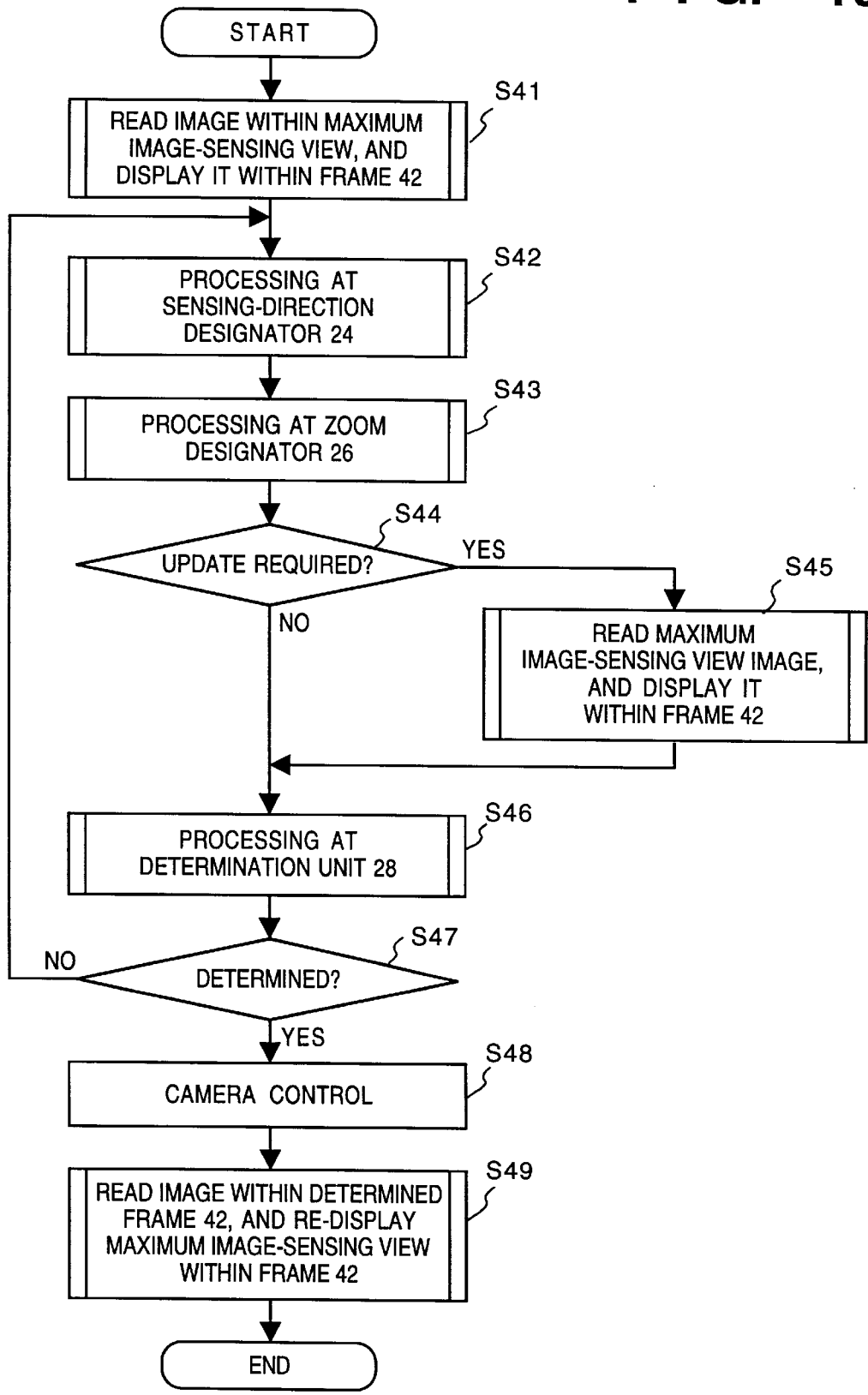
FIG. 10 is another modification example of the main routine.

FIG. 10 is another modification to the main routine where a currently-sensed image is displayed within the frame 42. After the camera control (S48), an image sensed by the video camera 10 is picked up. In the maximum view image stored in the memory unit 34 at step S45, an area corresponding to the frame 44 is updated using this image, i.e., the currently-sensed image. Thereafter, the maximum view image within the frame 42 is updated (S49).

This enables the operator to confirm which image portion in the maximum view image is actually image-sensed, and to easily judge to what levels panning/tilting and zooming are adjusted. Note that in the present embodiment, the window 46 has a fixed size which is larger than the movable area of the frame 42, however, the size of the window 46 may be variable. In this case, when the size of the window 46 is smaller, a part of the image can be displayed with a tool such as a slider bar. It is apparent that in this case, operation by GUI is partially limited.

As it is easily understood from the above description, the present embodiment can change frame size upon zooming, thus attains a natural way of display.

Further, pan/tilt and zoom statuses within a controllable range can be easily obtained, which enables the operator to quickly control the video camera with arbitrary control values. Further, as a maximum image-sensing area image is picked up and displayed within a corresponding frame, upon operating the video camera, the operator can see object(s) within an image-sensing area, which assists the operator to operate the video camera and improves operability.

[Second Embodiment]

Upon pan/tilt operation, the first embodiment displays the frame 44 indicating image-sensing area of the video camera 10 at a fixed position, and displays the frame 42, indicating a potential maximum image-sensing area by panning/tilting at a current zoom value. The panning/tilting of the video camera 10 is controlled by moving frame 42 within the window 46. When the zoom value is changed, the size of the frame 42 is changed so as to clarify the relativity between the frames 42 and 44.

In a second embodiment, panning/tilting is controlled by moving the frame 42, similar to the first embodiment. However, in this embodiment, the size of the frame 42 is not changed upon changing a zoom value, but the size of the frame 44, i.e., the frame corresponding to a boundary of a current image-sensing view of the video camera 10 is changed.

In the following description, elements corresponding to those in the first embodiment have the same reference numerals and the explanation of the elements will be omitted. Also, the construction of the apparatus is the same as that of the first embodiment and the explanation of the construction will be omitted. Note that similar to the first embodiment, a live video image displayed within the frame 44 is displayed by another window.

Figure 14:
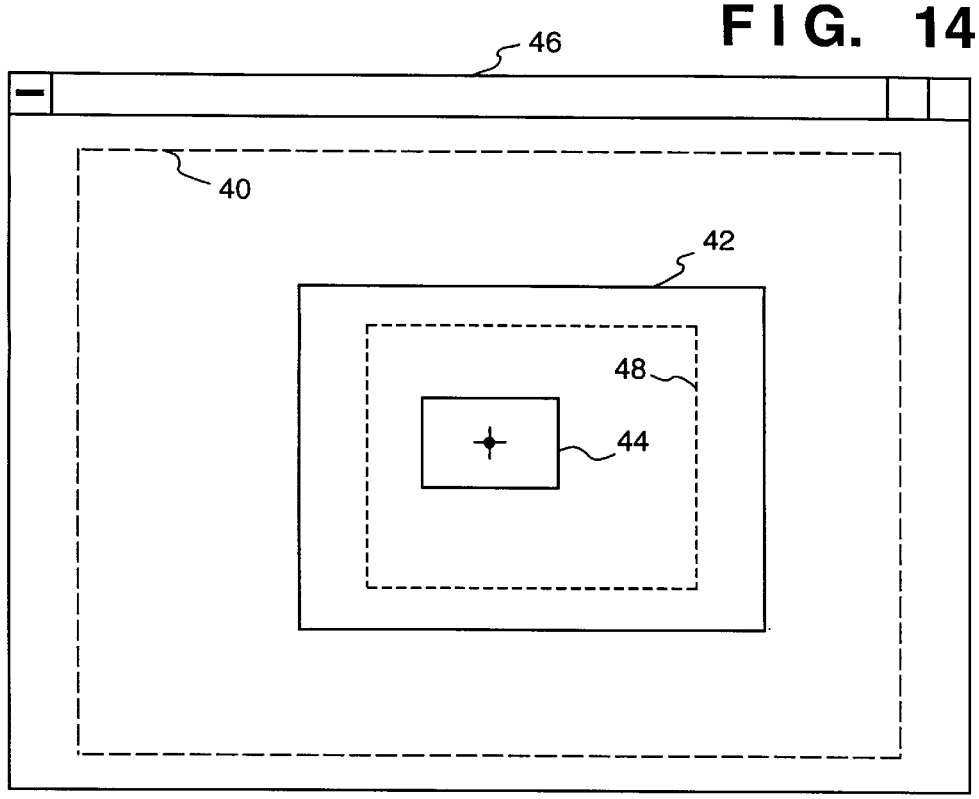
FIG. 14 is a display example according to a second embodiment.
Figure 15:
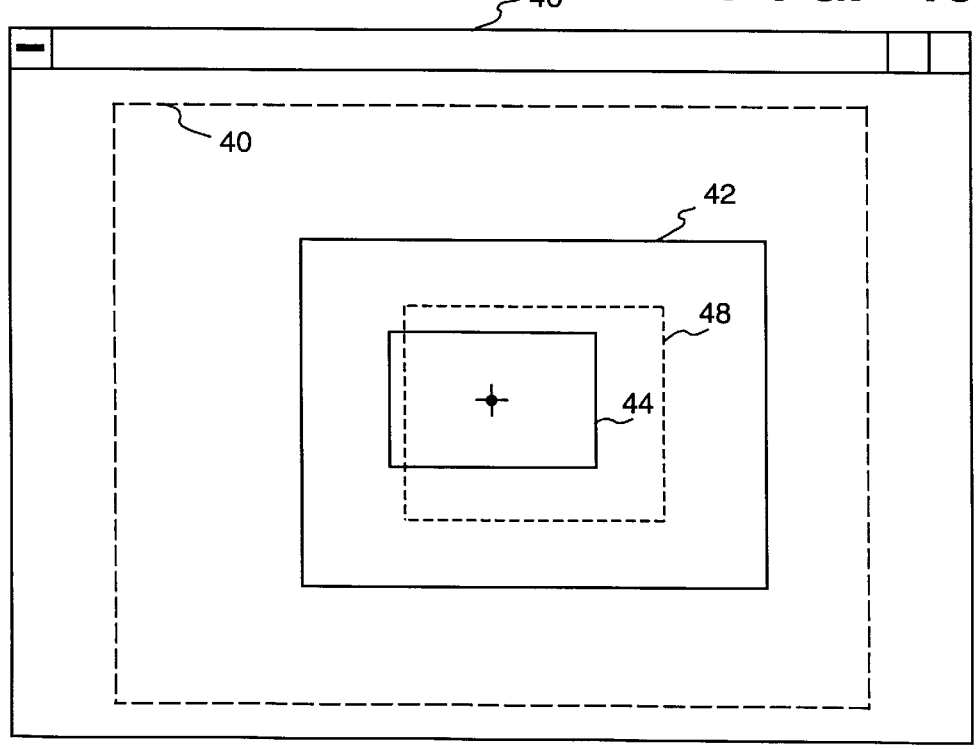
FIG. 15 is a display example according to a second embodiment.

FIGS. 14 and 15 are display statuses in the window 46 according to the second embodiment. FIG. 14 is a display example at the zoom value 3 (tele-end zooming); FIG. 15 is a display example at the zoom value 1 (wide-end zooming). As shown in these figures, the size of the frame 44 is changed in accordance with zoom value, but the size of the frame 42 is fixed regardless of the zoom value.

Similar to the first embodiment, the center of the frame 44 is fixed, and the frame 42 is movable.

As the frame 42 has a fixed size, a maximum movable range of the frame 42 is determined. A frame 40 indicates the maximum movable range of the frame 42. This enables the operator to see limitations of movement of the frame 42.

The processing procedures according to the second embodiment are similar to those described in FIGS. 5 to 8 or FIGS. 9 and 10, except the processing in FIG. 7 and that in FIG. 8 are changed as follows.

Figure 16:
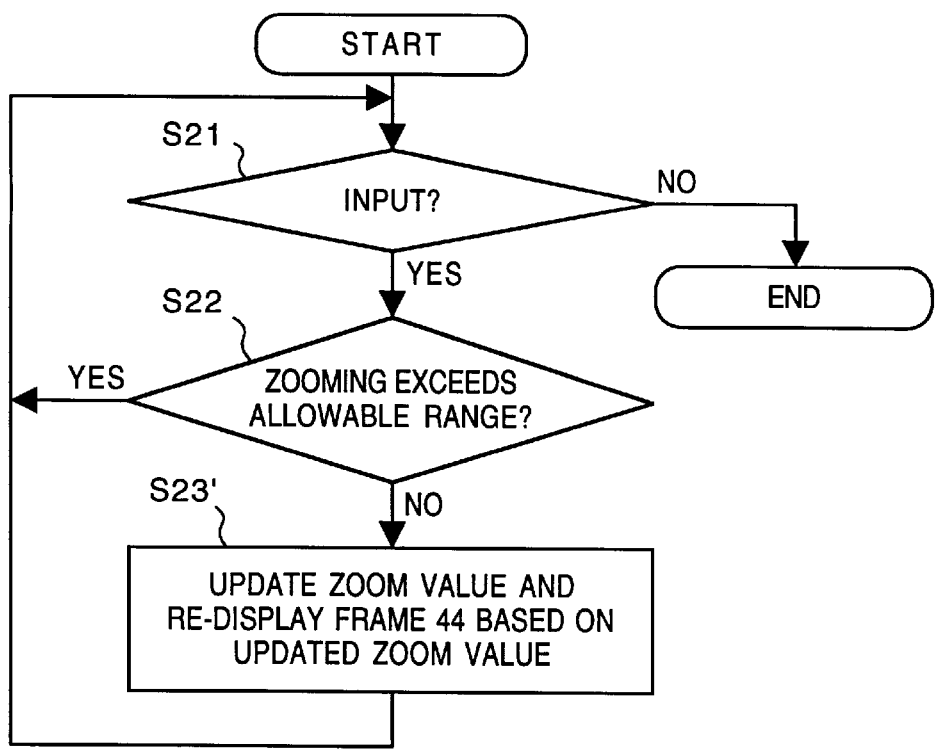
FIG. 16 is a flowchart showing in detail processing at step S2 in FIG. 5, according to the second embodiment.

First, processing of 48 indicating zoom instruction from the zoom designator 26 will be described with reference to the flowchart of FIG. 16.

At step S21, it is determined whether or not there has been input at the zoom designator 26. If YES, the process proceeds to step S22, at which it is determined whether or not the amount of control exceeds an operation allowable range. If YES, the process returns to step S21.

On the other hand, if the zooming does not exceed the allowable range, the process proceeds to step S23', at which the zoom value is updated, the size of the frame 44 is determined based on the updated zoom value, and the frame 44 is displayed in the determined size. At this time, the size of the frame 48 from the center of image-sensing area is also updated.

Figure 17:
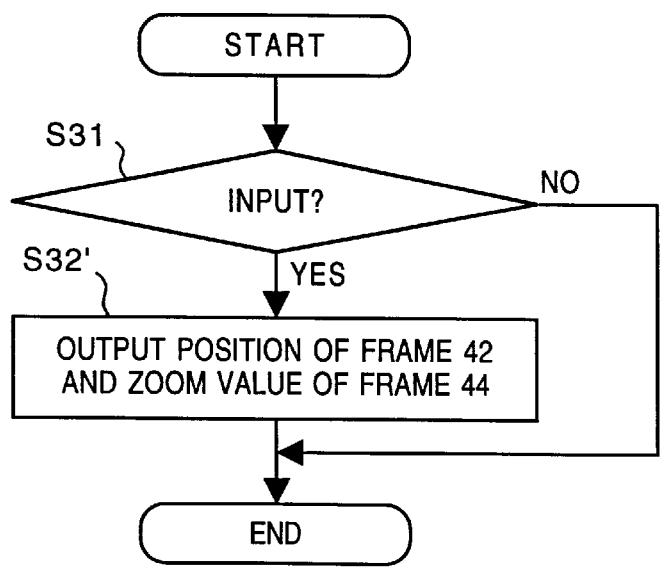
FIG. 17 is a flowchart showing in detail processing at step S3 in FIG. 5, according to the second embodiment.

In a case where there has been input at the determination unit 28, processing as shown in FIG. 17 is made.

First, at step S31, it is determined whether or not specific key-input has occurred at the determination unit 28 (e.g., manipulation of an ENTER key) or similar button manipulation on GUI) has been made. If YES, the process proceeds to step S32', at which control data (or signal) based on the position of the frame 42 and a zoom value of the frame 44 are outputted to the video camera 10.

Further, processing to display a potential image based on a current zoom value within the frame 42, i.e., the processing shown in FIG. 9 and that in FIG. 10 are substantially the same. Difference is that the size of the frame 42 is fixed and the size of the frame 44 changes based on the zoom value.

Accordingly, at steps S41 and S45 in FIG. 9 and FIG. 10, the image after zooming is fixed, as shown in FIG. 18.

Note that the processing at the other steps such as movement of the frame 42 are the same as those of the first embodiment, the explanation of the these steps will be omitted.

In the first and second embodiment, the size of the window 46 is fixed, however, it may be variable. In this case, the inside of the window 46 can be scrolled with scroll bars, otherwise, the sizes of the frames 42 and 44 can be changed in accordance with the size of the window 46.

As described above, the second embodiment enables the operator to easily determine panning, tilting and zooming statuses within a controllable range, and to quickly control the video camera with arbitrary control values without current statuses.

Further, as a maximum image-sensing area image is obtained and displayed within the corresponding frame, upon operating the video camera, the operator can see object(s) within an image-sensing area, which assists the operator to operate the video camera, i.e., improves operability.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A camera control apparatus for controlling a camera in which an image-sensing direction and image-sensing magnification can be arbitrarily controlled from an external device, said camera having a limiter for panning and tilting, comprising:

delimiter-display means for displaying a first delimiter indicating a maximum image-sensing area defined by said limiter of panning and tilting of said camera, and a second delimiter indicating a current image-sensing area, wherein a display position of said second delimiter is fixed, and a display position and a size of said first delimiter are changed in accordance with a current image-sensing direction and a current image-sensing magnification so that the display position and a size of said second delimiter correspond to the current image-sensing direction and its current image-sensing magnification.

2. The camera control apparatus according to claim 1, further comprising:

operation means for operating said first delimiter displayed by said display means; and control means for controlling the image-sensing direction and the image-sensing magnification of said camera, in accordance with operation of said first delimiter by said operation means, such that said first and second delimiters are displayed relatively to each other.

3. The camera control apparatus according to claim 1, further comprising second delimiter display means for, at a predetermined time, obtaining an image within the maximum image-sensing area at a current zoom value, while moving said camera within a controllable range in an image-sensing direction, and displaying the image within said first delimiter.

4. The camera control apparatus according to claim 3, wherein the predetermined time is the start of camera control.

5. The camera control apparatus according to claim 3, wherein the predetermined time is when an operator's specific instruction is inputted.

6. The camera control apparatus according to claim 3, wherein the predetermined time is when camera-operation input is determined.

7. The camera control apparatus according to claim 1, further comprising:
   camera-operation area setting means for setting a camera-operation area, inside or peripheral of said first delimiter;
   operation means for operating the camera-operation area; and
   control means for updating display of said first delimiter by said display means, and controlling said camera, in accordance with operation of the camera-operation area by said operation means.

8. The camera control apparatus according to claim 7, wherein said control means updates the display position of said first delimiter by said display means, and controls said camera, in accordance with a predetermined pointer operation of said operation means started from inside of the camera-operation area.

9. The camera control apparatus according to claim 7, wherein said control means updates the size of said first delimiter by said display means, and controls said camera, in accordance with a predetermined pointer operation of said operation means started from inside of the camera-operation area.

10. The camera control apparatus according to claim 1, wherein said first delimiter is displayed so as to indicate the maximum image-sensing area at a current image-sensing magnification defined by the limitation on image-sensing direction.

11. A camera control apparatus for controlling a camera in which at least panning and tilting can be arbitrarily controlled, said camera having a limiter for panning and tilting, comprising:
   display means for displaying a first delimiter indicating a potential maximum image-sensing area defined by said limiter of panning and tilting of said camera, and a second delimiter indicating a current image-sensing area, corresponding to current image-sensing conditions, at a position within said first delimiter; and
   control means for controlling a field of view of said camera by panning and tilting said camera in accordance with a predetermined operation,
   wherein a central position coordinates of said first delimiter are fixed, and display of said second delimiter is updated relatively to said first delimiter so that said first and second delimiters are displayed in accordance with the current image-sensing conditions.

12. The camera control apparatus according to claim 11, further comprising operation means for operating said first delimiter,
   wherein said control means controls said camera, in accordance with relativity of said first delimiter to said second delimiter by said operation means.

13. The camera control apparatus according to claim 11, further comprising second delimiter display means for, at a predetermined time, obtaining an image within the maximum image-sensing area at a current zoom value, while moving said camera within a controllable range in an image-sensing direction, and displaying the image within said first delimiter.

14. The camera control apparatus according to claim 13, wherein the predetermined time is the start of camera control.

15. The camera control apparatus according to claim 13, wherein the predetermined time is when an operator's specific instruction is inputted.

16. The camera control apparatus according to claim 13, wherein the predetermined time is when camera-operation input is determined.

17. The camera control apparatus according to claim 11, further comprising operation means including a pointing device such as a mouse, for operating a camera-operation area set around said second delimiter within said first delimiter,
   wherein said control means updates display of said second delimiter and controls said camera, in accordance with operation by said operation means.

18. The camera control apparatus according to claim 17, wherein said control means updates a display position of said first delimiter and controls said camera, in accordance with a predetermined drag operation of said operation means.

19. The camera control apparatus according to claim 17, wherein said control means updates a display size of said second delimiter and controls said camera, in accordance with a predetermined drag operation of said operation means.

20. A camera control apparatus for controlling a camera in which an image-sensing direction can be controlled from an external device, said camera having a limiter for panning and tilting, comprising:
   first delimiter display means for displaying a first delimiter indicating a current image-sensing area of said camera;
   second delimiter display means for displaying a second delimiter indicating an image-sensing enable range defined by said limiter of panning and tilting of said camera;
   display-position change means for changing a display position of said second delimiter based on a predetermined instruction; and
   control means for controlling the image-sensing direction of said camera in accordance with the predetermined instruction.

21. The camera control apparatus according to claim 20, wherein said camera can be controlled from an external device.

22. The camera control apparatus according to claim 21, further comprising:
   magnification setting means for setting an image-sensing magnification of said camera; and
   delimiter-size change means for setting a size of said second delimiter, in accordance with the magnification set by said magnification setting means.

23. The camera control apparatus according to claim 22, further comprising:
   image generation means for generating an image of a wide view by linking a plurality of images obtained by image sensing of said camera while sequentially updating the image-sensing direction; and image display means for processing image data, corresponding to the image-sensing enable area indicated by said second delimiter, within the image generated by said image generation means, and displaying the image data within said second delimiter.

24. The camera control apparatus according to claim 23, wherein said image generation means generates the image of a wider view by linking images image-sensed at a lowest magnification.

25. The camera control apparatus according to claim 26, wherein said image display means includes:

extraction means for extracting an area of a size based on the current image-sensing magnification of said camera, from the image generated by said image generation means; and magnification means for magnifying the area extracted by said extraction means, in accordance with the size of said second delimiter.

26. The camera control apparatus according to claim 21, further comprising:

magnification setting means for setting an image-sensing magnification of said camera; and delimiter-size change means for setting a size of said first delimiter, in accordance with the magnification set by said magnification setting means.

27. The camera control apparatus according to claim 26, further comprising:

image generation means for generating an image of a wide view by linking a plurality of images obtained by image sensing of said camera while sequentially updating the image-sensing direction; and image display means for processing image data, corresponding to the image-sensing enable area indicated by said second delimiter, within the image generated by said image generation means, and displaying the image data within said second delimiter.

28. The camera control apparatus according to claim 27, wherein said image generation means generates the image of wider view by linking images image-sensed at a lowest magnification.

29. The camera control apparatus according to claim 28, wherein said image display means includes:

extraction means for extracting an area of a size based on the current image-sensing magnification of said camera, from the image generated by said image generation means; and magnification means for magnifying the area extracted by said extraction means, in accordance with the size of said second delimiter.

30. A camera control method for controlling an apparatus for controlling a camera in which an image-sensing direction can be controlled from an external device, said camera having a limiter for panning and tilting, comprising:

a first delimiter display step of displaying a first delimiter indicating a current image-sensing area of said camera;

a second delimiter display step of displaying a second delimiter indicating an image-sensing enable range defined by said limiter of panning and tilting of said camera;

a display-position change step of changing a display position of said second delimiter in accordance with a predetermined instruction; and a control step of controlling the image-sensing direction of said camera in accordance with the predetermined instruction.

31. The camera control method according to claim 30, wherein said camera can be controlled from an external device.

32. The camera control method according to claim 30, further comprising:

a magnification setting step of setting an image-setting magnification of said camera; and a delimiter-size change step of changing a size of said second delimiter, in accordance with the magnification set at said magnification setting step.

33. The camera control method according to claim 32, further comprising:

an image generation step of generating an image of a wide view by linking a plurality of images obtained by image sensing of said camera while sequentially updating the image-sensing direction; and an image display step of processing image data, corresponding to the image-sensing enable area indicated by said second delimiter, within the image generated at said image generation step, and displaying the image data within said second delimiter.

34. The camera control method according to claim 33, wherein at said image generation step, the image of a wider view is generated by linking images image-sensed at a lowest magnification.

35. The camera control method according to claim 34, wherein said image display step includes:

an extraction step of extracting an area of a size based on the current image-sensing magnification of said camera, from the image generated at said image generation step; and a magnification step of magnifying the area extracted at said extraction step, in accordance with the size of said second delimiter.

36. The camera control method according to claim 30, further comprising:

a magnification setting step of setting an image-setting magnification of said camera; and a delimiter-size change step of changing a size of said first delimiter, in accordance with the magnification set at said magnification setting step.

37. The camera control method according to claim 36, further comprising:

an image generation step of generating an image of a wide view by linking a plurality of images obtained by image sensing of said camera while sequentially updating the image-sensing direction; and an image display step of processing image data, corresponding to the image-sensing enable area indicated by said second delimiter, within the image generated at said image generation step, and displaying the image data within said second delimiter.

38. The camera control method according to claim 37, wherein at said image generation step, the image of wider view is generated by linking images image-sensed at a lowest magnification.

39. The camera control method according to claim 38, wherein said image display step includes:

an extraction step of extracting an area of a size based on the current image-sensing magnification of said camera, from the image generated at said image generation step; and a magnification step of magnifying the area extracted at said extraction step, in accordance with the size of said second delimiter.

40. A computer product constructed by a storage medium holding program codes for controlling a camera in which an image-sensing direction can be controlled from an external device, said camera having a limiter for panning and tilting, comprising;

first-delimiter display process program codes for displaying a first delimiter indicating a current image-sensing area of said camera;

second-delimiter display process program codes for displaying a second delimiter indicating an image-sensing enable range defined by said limiter of panning and tilting of said camera;

display-position change process program codes for changing a display position of said second delimiter in accordance with a predetermined instruction; and control process program codes for controlling the image-sensing direction of said camera in accordance with the predetermined instruction.

41. A camera control apparatus for controlling a camera in which an image-sensing direction and image-sensing magnification can be arbitrarily controlled from an external device, comprising:

delimiter-display means for displaying a first delimiter indicating a maximum image-sensing area which is defined by a limit of panning and tilting and exceeding a current image-sensing range of said camera, and a second delimiter indicating the current image-sensing area of said camera, wherein a display position of said second delimiter is fixed, and a display position and a size of said first delimiter are changed in accordance with a current image-sensing direction and a current image-sensing magnification so that the display position and a size of said second delimiter correspond to the current image-sensing direction and the current image-sensing magnification.

42. The camera control according to claim 41, further comprising:

operations means for operating said first delimiter displayed by said display means; and control means for controlling the image-sensing direction and the image-sensing magnification of said camera, in accordance with operation of said first delimiter by said operation means, such that said first and second delimiters are displayed relatively to each other.

43. The camera control apparatus according to claim 41, further comprising second delimiter display means for, at a predetermined time, obtaining an image within the maximum image-sensing area at a current zoom value, while moving said camera within a controllable range in an image-sensing direction, and displaying the image within said first delimiter.

44. The camera control apparatus according to claim 43, wherein the predetermined time is the start of camera control.

45. The camera control apparatus according to claim 43, wherein the predetermined time is when an operator's specific instruction is inputted.

46. The camera control apparatus according to claim 43, wherein the predetermined time is when camera-operation input is determined.

47. The camera control apparatus according to claim 41, further comprising:

camera-operation area setting means for setting a camera-operation area, inside or peripheral of said first delimiter;

operation means for operating the camera-operation area; and control means for updating display of said first delimiter by said display means, and controlling said camera, in accordance with operation of the camera-operation area by said operation means.

48. The camera control apparatus according to claim 47, wherein said control means updates the display position of said first delimiter by said display means, and controls said camera, in accordance with a predetermined pointer operation of said operation means started from inside of the camera-operation area.

49. The camera control apparatus according to claim 47, wherein said control means updates the size of said first delimiter by said display means, and controls said camera, in accordance with a predetermined pointer operation of said operation means started from inside of the camera-operation area.

50. The camera control apparatus according to claim 41, wherein said first delimiter is displayed so as to indicate the maximum image-sensing area at a current image-sensing magnification.

51. A camera control apparatus for controlling a camera in which at least panning and tilting can be arbitrarily controlled; comprising:

display means for displaying a first delimiter indicating a potential maximum image-sensing area defined by limitations on panning and tilting and exceeding a current image-sensing area of said camera, and a second delimiter indicating the current image-sensing area of said camera, corresponding to current image-sensing conditions, at a position within said first delimiter; and control means for controlling a field of view of said camera by panning and tilting said camera in accordance with a predetermined operation, wherein a central position coordinates of said first delimiter are fixed, and display of said second delimiter is updated relatively to said first delimiter so that said first and second delimiters are displayed in accordance with the current image-sensing conditions.

52. The camera control apparatus according to claim 51, further comprising operation means for operating said first delimiter, wherein said control means controls said camera, in accordance with relativity of said first delimiter to said second delimiter by said operation means.

53. The camera control apparatus according to claim 51, further comprising second delimiter display means for, at a predetermined time, obtaining an image within the maximum image-sensing area at a current zoom value, while moving said camera within a controllable range in an image-sensing direction, and displaying the image within said first delimiter.

54. The camera control apparatus according to claim 53, wherein the predetermined time is the start of camera control.

55. The camera control apparatus according to claim 53, wherein the predetermined time is when an operator's specific instruction is inputted.

56. The camera control apparatus according to claim 53, wherein the predetermined time is when camera-operation input is determined.

57. The camera control apparatus according to claim 51, further comprising operation means including a pointing device such as a mouse, for operating a camera-operation area set around said second delimiter within said first delimiter, wherein said control means updates display of said second delimiter and controls said camera, in accordance with operation by said operation means.

58. The camera control apparatus according to claim 57, wherein said control means updates a display position of said first delimiter and controls said camera, in accordance with a predetermined drag operation of said operation means.

59. The camera control apparatus according to claim 57, wherein said control means updates a display size of said second delimiter and controls said camera, in accordance with a predetermined drag operation of said operation means.

* * * * *

UNITED STATES PATENT AND TRADEMARK OFFICE
CERTIFICATE OF CORRECTION

PATENT NO. : 6,008,837
DATED : December 28, 1999
INVENTOR(S) : Hiroki Yonezawa

It is certified that error appears in the above-identified patent and that said Letters Patent is hereby corrected as shown below:

Title page,
Please insert as follows:

-- [56] References Cited

U.S. PATENT DOCUMENTS

| | | | |
|---|---|---|---|
| 5,526,037 | 6/11/96 | Cortjens et al. | 348/15 |
| 5,528,289 | 6/18/96 | Cortjens et al. | 348/15 |
| 5,515,099 | 5/7/96 | Cortjens et al. | 348/15 |
| 5,450,140 | 9/12/95 | Washino | 348/722 |
| 5,325,202 | 6/28/94 | Washino | 348/722 |
| 4,893,202 | 1/9/90 | Smith | 348/213 -- |

Signed and Sealed this

Nineteenth Day of March, 2002

Attest:

*Attesting Officer*

JAMES E. ROGAN
*Director of the United States Patent and Trademark Office*